US005900278A

United States Patent [19]

Coffinberry et al.

[11] Patent Number: 5,900,278

[45] Date of Patent: May 4, 1999

[54] METHODS RELATED TO PROTECTIVE COATINGS FOR SUPERALLOYS

[75] Inventors: George A. Coffinberry, West Chester, Ohio; John F. Ackerman, Cheyenne, Wis.; William R. Stowell, Rising Sun, Ind.

[73] Assignee: General Electric Company, Cincinnati, Ohio

[21] Appl. No.: 09/136,950

[22] Filed: Aug. 20, 1998

Related U.S. Application Data

[62] Division of application No. 08/804,846, Feb. 24, 1997, Pat. No. 5,849,416, which is a continuation of application No. 08/973,679, Dec. 18, 1995, abandoned.

[51] Int. Cl.$^{6}$ .......... D05D 3/02

[52] U.S. Cl. .......... 427/227; 427/397.7

[58] Field of Search .......... 427/227, 397.7

[56] References Cited

U.S. PATENT DOCUMENTS

| | | | |
|---|---|---|---|
| 3,837,901 | 9/1974 | Seybolt | 117/107.2 |
| 4,500,364 | 2/1985 | Krutenat | 148/6.14 R |
| 4,943,485 | 7/1990 | Allam et al. | 428/457 |
| 5,035,957 | 7/1991 | Bartlett et al. | 428/552 |
| 5,077,140 | 12/1991 | Luthra et al. | 428/660 |
| 5,113,582 | 5/1992 | Monson et al. | 29/889.2 |
| 5,127,795 | 7/1992 | Plemmons et al. | 415/177 |
| 5,173,929 | 12/1992 | Ruzzo | 378/50 |
| 5,188,457 | 2/1993 | O'Hara | 374/104 |
| 5,210,944 | 5/1993 | Monson et al. | 29/889.2 |
| 5,216,808 | 6/1993 | Martus et al. | 29/889.1 |
| 5,221,354 | 6/1993 | Rigney | 118/725 |
| 5,224,822 | 7/1993 | Lenahan et al. | 415/189 |
| 5,240,518 | 8/1993 | Wortman et al. | 148/404 |
| 5,336,560 | 8/1994 | Spence et al. | 428/336 |
| 5,395,697 | 3/1995 | Morrison | 428/412 |
| 5,409,773 | 4/1995 | Kessel et al. | 428/352 |

*Primary Examiner*—James J. Bell
*Attorney, Agent, or Firm*—Andrew C. Hess; Rodney M. Young

[57] ABSTRACT

A superalloy component having a substrate article of a superalloy, and a strengthenable coating covering at least a portion of the substrate article. The coating exhibits thermal barrier characteristics and when cured formed a ceramic material. The component may further include a fiber layer between the substrate article and the coating, and the coating may be reinforced with fiber and the ceramic may be imbedded with inorganic particles. The coating is a foam obtained by reacting an admixture of (a) a silane polymer, (b) a silicone-vinyl resin and (c) a catalyst. The article is preferably a turbine blade. The component is useful as a gas turbine element.

6 Claims, 1 Drawing Sheet

METHODS RELATED TO PROTECTIVE COATINGS FOR SUPERALLOYS

This application is a Divisional of application Ser. No. 08/804,846, filed Feb. 24, 1997, U.S. Pat. No. 5,849,416, which is a Continuation of application Ser. No. 08/573,679, filed on Dec. 18, 1995 abandoned.

BACKGROUND OF THE INVENTION

1. Field of the Invention

This invention relates to the protection of superalloys to be used at elevated temperatures, and, more particularly, to coatings applied to such superalloys, components thereof, and methods related to providing such coatings.

2. Description of the Related Art

One of the most demanding materials applications in current technology is found in the hot-stage components used in aircraft jet engines. The higher the operating temperature of an engine, the greater its efficiency, and the more power it can produce from each gallon of fuel. There is therefore an incentive to operate such engines at as high a temperature as possible. The primary limitation on the operating temperatures of a jet engine is the materials used in the hottest regions of the engine, such as gas turbine blades and vanes.

There has been much research to develop materials that can be used in high temperature engine applications. The currently most popular and successful of such materials are the nickel-base superalloys, which are alloys of nickel with additions of a number of other elements such as, for example, chromium, cobalt, aluminum, and tantalum. The compositions of these superalloys are carefully engineered to maintain their strength and other mechanical properties even during use at the high temperature of engine operation, which is in the neighborhood of 2000° F. or more.

The materials used in the jet engines must operate at high temperatures, but additionally are subjected to oxidative and corrosive conditions. Oxidation of materials such as nickel and many of its alloys is rapid at engine operating temperatures. The engine components are also subjected to corrosive attack by chemicals in the burned fuel, as well as ingested agents such as salt that might be drawn into the engine as it operates near an ocean. The materials that have the best mechanical properties at high temperatures often are not as resistant to oxidation and corrosion as other materials, and there is an ongoing search for materials that offer a compromise between the best mechanical properties and the best oxidation and corrosion resistance.

High operating temperature capability can also be achieved by other techniques not related directly to the alloy compositions used in the components. For example, control of grain structures and preparation of components as single crystals may result in improved properties. Cooling passages may be provided in the components, and cooling air passed through them to lower their actual operating temperature.

The coating must be adherent to the superalloy substrate and must remain adherent through many cycles of heating to the operating temperature and then cooling back to a lower temperature when the engine is idling or turned off. Because materials of different compositions have different coefficients of thermal expansion, cycles of heating and cooling tend to cause the coating to crack and/or spall off, which results in the exposure of the superalloy substrate to the environment, and subsequent deterioration of the substrate.

Thermal barrier coatings have typically been applied to such substrates, but there has been a general desire to improve the thermal shock resistance, erosion resistance, weight, surface emissivity, heat transfer coefficient, adherence to superalloy substrates and/or compatibility with nickel based superalloys.

SUMMARY OF THE INVENTION

The present invention provides coated superalloy components and methods for coating a superalloy substrate article to provide a coated superalloy component. The component has a substrate article formed of a superalloy, and, a coating covering at least a portion of the substrate article. The coating is strengthened by heat treatment and is in the form of a foam obtained by reacting an admixture comprising (a) a silane polymer, (b) a silicone-vinyl resin and preferably (c) a catalyst. The coating is useful as a thermal barrier coating material useful for high temperature gas turbines and is thermal shock resistant, erosion resistant, light weight, capable of having a controlled emissivity surface to minimize the radiant heat loading on the component, has a low heat transfer coefficient, adheres strongly to superalloy substrates (article), and is chemically compatible with nickel based superalloys and hot gas environments of aircraft gas turbines. The coating has a characteristic emission band which can be used to detect coating failure while the turbine is operating, and the coating may be applied to superalloys efficiently with a minimal amount of effort.

DETAILED DESCRIPTION OF THE INVENTION

Figure 1:
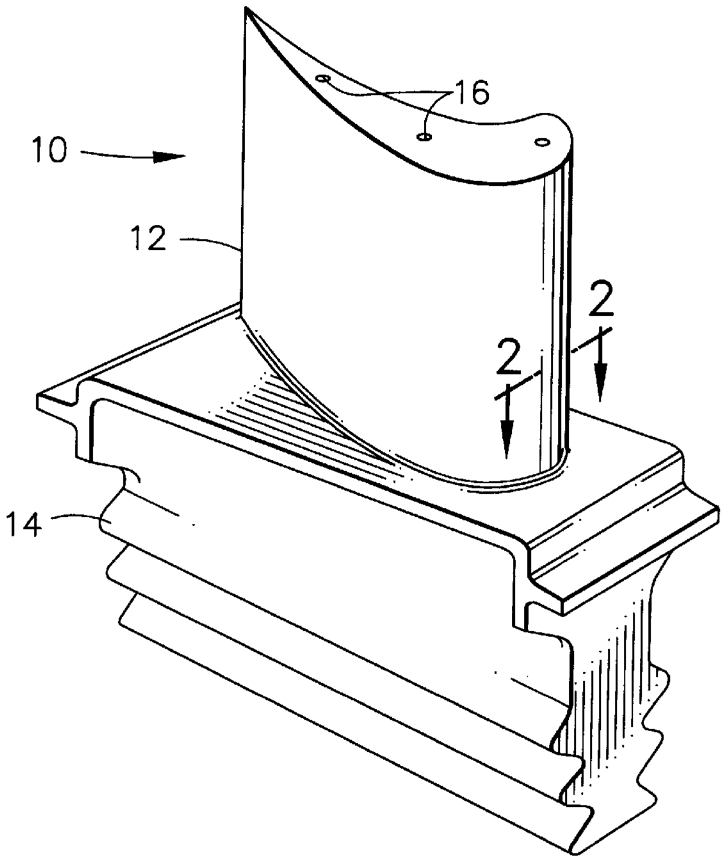
FIG. 1 is a perspective view of a turbine blade having a coating according to the present invention.

The coating is a foam produced (obtained by) reacting an admixture comprising (a) a silane polymer and (b) a silicone-vinyl resin, preferably in the presence of (a) a catalyst. This reaction produces a microporous silicone foam with high thermal resistance and a temperature capability to 200° C. Slow baking (curing) of the silicone foam produces a microporous silica structure which develops strength when fired at 1400° C. The silica structure has high thermal resistance and enough strength for some of the static applications in turbines. The coating is useful for covering at least a portion of a superalloy substrate article to produce a coated superalloy component.

The coated superalloy component has (a) a substrate article formed of a superalloy; and (b) a coating covering at least a portion of the substrate article. The thermal shock resistance of the component can be improved by applying an in-plane layer of inorganic fibers such as Si (glass or carbon fibers onto the above coating (first coating layer)). The inorganic fiber layer, if randomly dispersed in a plane, can rapidly spread the heat produced by a point and thereby reduce thermal stresses. This intermediate fiber layer can then be coated with a second layer of the silicone foam to produce a multilayer structure (component) having a high thermal resistivity and low thermal stresses.

The silicone foams provided herein exhibit very low thermal conductivity (good insulative properties), low densities, high strength and flexibility, low cost, high temperature capability, and ease of manufacture. The foam may be loaded with fillers.

The silicone foam can be cured to a high temperature ceramic which will maintain in insulation characteristics and structural integrity to 1400° C., and even up to 1600° C. Suitable catalysts include Karstedt reagents and other platinum compounds such as platinum tetra acetyl acetonate and potassium tetrachloro platinate, and other platinum compounds platinum tetra acetyl acetonate, potassium tetrachloro platinate, and others.

Suitable silicone-vinyl resins include polymeric resins represented by the general formula:

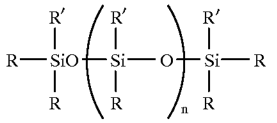

wherein each R', and R, is independently selected from saturated and unsaturated hydrocarbons such as aryl/alkaryls and aralkyls, and are preferably selected from $C_1$ to $C_{18}$ alkyls, $C_2$ to $C_{18}$ alkenes and $C_6$ to $C_{18}$ aromatics, wherein at least some vinyl unsaturation is present in the resin. The silicone-vinyl resin preferably contains moieties of the formula

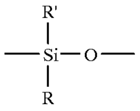

wherein at least one of R' and R is an alkene, for example, moieties of the formula

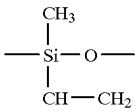

Examples of aromatic substituted moieties include

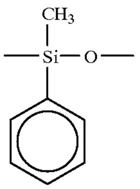

Preferably n is selected from between 1 and 1000, more preferably from between 5 and 100. Examples of substituent groups include methyl, ethyl, propyl, phenyl, tolyl and xylyl groups. The siloxane-vinyl resin may also be in a branched form.

The silane polymer may be represented by the general formula:

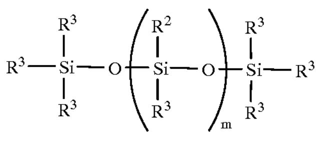

wherein each $R^2$ is preferably a hydrogen and each $R^3$ is independently selected from hydrocarbons and hydrogen. Suitable $R^3$'s may be selected from alkyl, and aromatic groups set out above for R and R'.

Preferably the silane polymer is of the formula

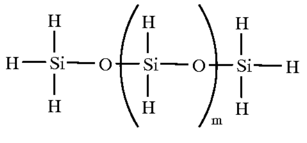

and preferably m is selected from 1 and 1000, more preferably between 10 and 500.

The use of Karstedt's reagent permits control of the desired level of polymers to void volume ratio and the control of the amount of three dimensional crosslinking (for higher strength) within the foam and ceramic.

The silicone-vinyl polymer will have alkane and alkene hydrocarbon substituents. By having aromatic substituents present, flexible foams may be achieved in stable form at high temperatures, for example, aromatic substituents may yield foams stable to 600° C. compared to purely alkane/alkene substituents yielding foam flexible up to only about 300° C.

The ceramic may be structurally strengthened by imbedding coated fibers in the foam prior to the curing cycle. Directional strength properties may be enhanced by aligning the fibers. Fibers may be aligned (given a substantially uniform directional orientation), by mechanical and electromagnetic techniques. Structural strength of the ceramic structure may be increased by infiltrating the porous structures after firing with silica (for example, LPCVD silica), titania or other particles to strengthen the ceramic.

The admixture may further contain (be mixed with) fumed silica, titania or rare earth oxides prior to being foamed, cured and fired. Also, the coating may be embedded with (contain) fluorescing additives such as europium oxide or other rare earth oxides to provide the coating with the capability to be monitored in situ while the turbine is opera ting.

The admixture may be applied using commercially available two-nozzle spray technology. The admixture may be applied as a foam to a superalloy substrate, and subsequently cured at a suitable temperature, for example, between 1000° C. and 1100° C.

The components are especially useful as gas turbine components such as turbane blades and turbane vanes.

As shown in FIG. 1, such a component (blade) (10) includes an airfoil section (12) against which hot combustion gases are directed when the engine operates, and whose surface is subjected to severe oxidation and corrosion attack during service. If the surface of the airfoil section (12) is not protected against oxidation and corrosion in some fashion, it will last at most only a few cycles of operation. The airfoil section (12) is anchored to a turbine disk (not shown) through a root section (14). In some cases, cooling passages (16) are present in the airfoil section (12), through which cool bleed air is forced to remove heat from the blade (10). The blade (10) is normally prepared by a casting and solidification procedure well known to those skilled in the art, such as investment casting or, more preferably, directional solidification or single crystal growth.

Figure 2:
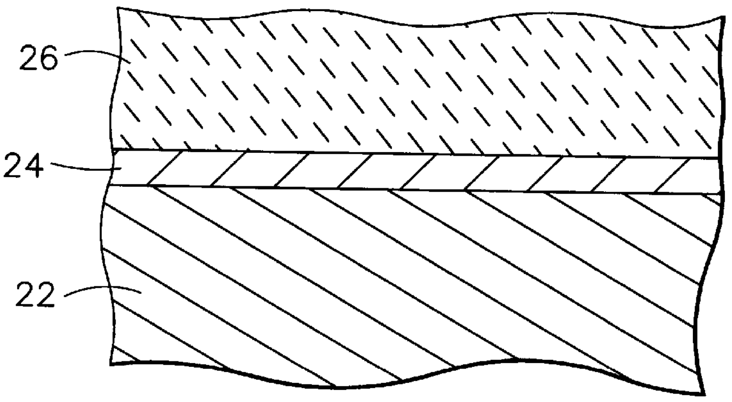
FIG. 2 is a sectional view of the blade of FIG. 1 taken along lines 2—2 having a thermal barrier coating and a base coat.

As shown in FIG. 2, the coating of the present invention is applied over an optional base coating (24) overlying the substrate (22). As shown in FIG. 2, a ceramic thermal barrier coating (26) is applied overlying the base coating (24). Base coatings are well known and are useful for enhancing adhesion between thermal barrier coatings and substrates.

Thus, the present approach provides an advancement in the protection of superalloy substrates, and more particularly nickel-base superalloy substrates by protective coatings. Although the present invention has been described in connection with specific examples and embodiments, it will be understood by those skilled in the arts involved, that the present invention is capable of modification without departing from its spirit and scope as represented by the appended claims.

We claim:

1. A method for providing a gas turbine with a protective thermal barrier coating, said method comprising the steps of:

(a) applying a coating material to a superalloy substrate article, said coating material covering at least a portion of said substrate article, wherein said coating material is a foam obtained by reacting an admixture comprising:

a silane polymer of the formula

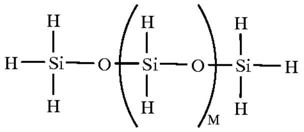

a silicone-vinyl resin comprising alkene moieties, and a catalyst; and (b) curing said coating material to produce a temperature resistant foamed ceramic.

2. The method of claim 1 further comprising the step of placing a fiber layer between said substrate article and said coating material.

3. The method of claim 1 wherein said coating material further comprises reinforcing inorganic fibers:

a silicone-vinyl resin comprising alkene moieties, and a catalyst; and (b) curing said coating material to produce a temperature resistant foamed ceramic.

4. The method of claim 1 further comprising the step of placing a fiber layer between said substrate article and said coating material.

5. The method of claim 1 wherein said coating material further comprises reinforcing inorganic fibers.

6. The method of claim 1 further comprising the step of infiltrating the foamed ceramic with particles selected from the group consisting of silica and titania.

* * * * *